United States Patent [19]

Bauer et al.

[11] Patent Number: 4,685,350
[45] Date of Patent: Aug. 11, 1987

[54] PUSH-PULL CABLE MOUNTING ASSEMBLY

[75] Inventors: Karl-Heinz Bauer; Heinz Fick, both of Bad Neustadt/Saale, Fed. Rep. of Germany

[73] Assignee: Preh Elektrofeinmechanische Werke Jakob Preh Nacht. GmbH & Co., Bad Neustadt/Saale, Fed. Rep. of Germany

[21] Appl. No.: 798,418

[22] Filed: Nov. 15, 1985

[30] Foreign Application Priority Data

Nov. 15, 1984 [DE] Fed. Rep. of Germany ....... 3441716

[51] Int. Cl.⁴ .............................................. F16C 1/10
[52] U.S. Cl. ................................................. 74/501 R
[58] Field of Search ........ 74/500.5, 501.5 R, 501.5 H, 74/501.6, 502, 502.1, 502.2, 502.3, 502.4, 502.5, 502.6

[56] References Cited

U.S. PATENT DOCUMENTS

| 1,453,426 | 5/1923 | Williams | 74/502.4 |
|---|---|---|---|
| 3,253,480 | 5/1966 | Fernberg | 74/502.4 |
| 3,273,417 | 9/1966 | Sevrence | 74/501.5 R |
| 3,398,600 | 8/1968 | White et al. | 74/502.5 |
| 3,784,242 | 1/1974 | Hill | 74/502.4 |
| 3,955,441 | 5/1976 | Johnson | 74/502.4 |
| 4,095,483 | 6/1978 | Sageant | 74/502.4 |
| 4,266,439 | 5/1981 | Hayashi et al. | 74/502.4 |
| 4,304,149 | 12/1981 | Heimann | 74/502.4 |
| 4,447,032 | 5/1984 | Olsen | 74/502.4 |

FOREIGN PATENT DOCUMENTS

| 2601308 | 7/1976 | Fed. Rep. of Germany | 74/502.4 |
|---|---|---|---|
| 2334535 | 7/1977 | France | 74/502.1 |

Primary Examiner—Gary L. Smith
Assistant Examiner—Vinh Luong
Attorney, Agent, or Firm—Woodcock Washburn Kurtz Mackiewicz & Norris

[57] ABSTRACT

A device for fixing an end of a shouldered casing containing and guiding a pulling or pressing cable includes a holding block with a recess extending axially into the block and a slot extending axially through and radially into the block and into the recess for inserting the casing into the block and recess. An edge surface of the recess surrounds and interferringly engages a shoulder of the casing and while a bottom of the recess interferringly engages the shoulder. A flexible tongue is provided facing the recess and serving as a stop for either the transverse end surface of the end of the casing or a similar transverse side surface of the shoulder.

10 Claims, 2 Drawing Figures

PUSH-PULL CABLE MOUNTING ASSEMBLY

BACKGROUND OF THE INVENTION

The invention relates to fasteners and, in particular, to a device for receiving and fixing an end of a tubular casing provided with a shoulder.

A Bowden cable having having a cushioning flange attached to an end thereof for fixing the end of the cable is described in DE-OS No. 32 47 115. A bushing portion of the flange is inserted into an opening of a fastening wall and is fixed from the opposite side with a pressing ring. This mode of fastening involves several manipulations and steps.

A tube holder, which is similar to a coupling part shown in Utility Model No. G 83 32 864, is described in DE-OS No. 29 21 235. A tube held by the holder is also fixed in an axial direction through a support wall.

A self-locking cable fixing means with an internal bushing and an external bushing is described in DE-OS No. 28 21 374 again for fixing a cable through a support wall. Assembly of this device is also not simple.

OBJECTS OF THE INVENTION

An object of the present invention is to provide a fixing device generally of the type described above in which the tubular casing of a flexible member can be fixed on a holding block in a simple manner.

It is another object to provide means for receiving and retaining an end of a tubular casing provided with a shoulder for fixing said casing and said shoulder.

It is another object of the invention to provide a device suitable for receiving and a fixing tubular casing with shoulder to a planar support surface in a direction substantially parallel to the plane of the surface.

It is another object to provide a fastening device with a snap engagement for receiving and fixing a tubular casing with shoulder.

SUMMARY OF THE INVENTION

The above objects and others are accomplished according to the present invention with the provision of a cable fixing device comprising a holding block having a recess, that is open axially on one side and has a bottom for receiving a side of a shoulder of the casing turned away from an end of the casing in interference engagement and an edge surface extending between the bottom and one open side for surrounding the shoulder. A radially open slot extends radially into the holding block, including the edge surface and bottom of the recess, and axially completely through the block, again including the edge surface and bottom, from the one side, for receiving a casing in the block and recess. The slot is at least as broad as the outer diameter of the casing for receiving the casing and is less broad than the outer diameter of the shoulder, at least in the zone of the edge surface and bottom for retaining the shoulder in the recess. A flexible tongue is positioned in front of the block facing said one side and recess, aligned with the slot, for stopping by interference engagement therewith a transverse surface of the casing, either the front side of the end of the casing or a side of the shoulder.

One advantage of the invention is that the provision of a single shoulder on the casing is sufficient for fixing the casing. Such a shoulder can be prepared on the casing proper by suitable means for the casing used, i.e. forming a thermoplastic casing at elevated temperature.

Fixing the casing to the holding block is extremely simple. The casing is simply inserted into the slot and then pulled so that its shoulder enters the recess. The flexible tongue before the front side of the block now spans the front end of the casing. The casing is held secure against movement in one axial direction by the interference of the shoulder, with the recess bottom. It is secured against movement in the other axial direction by the flexible tongue. At the same time, the edge wall of the recess prevents the casing from jumping out of the slot (i.e. radial movement) by surrounding the shoulder.

Since it is simple to fix the casing to the holding block, casing insertion can be carried out in narrow space and under poor visibility conditions. The casing can also be fixed to the holding block with a machine.

Other advantages and embodiments of the present invention will appear from the following description of the preferred embodiment and from the attached claims and drawings.

DETAILED DESCRIPTION OF A PREFERRED EMBODIMENT OF THE INVENTION

Figure 1:
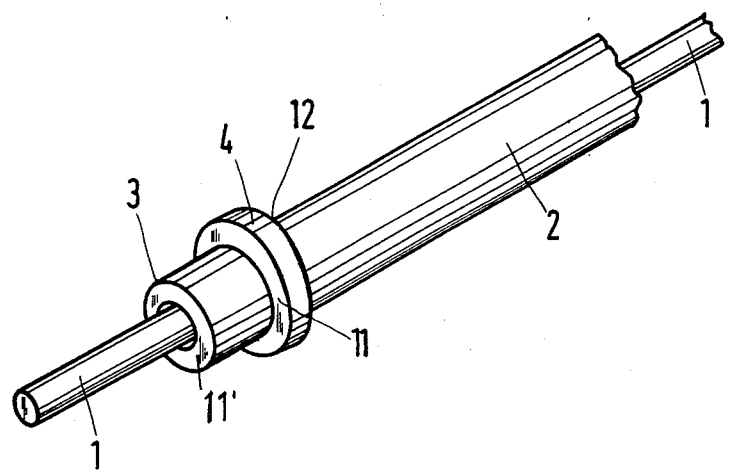
FIG. 1 shows a flexible pulling and pushing cable with a casing and casing shoulder with which the invention is used.

In both figures, flexible cable 1 is movably guided in a plastic casing 2. In the zone of the end 3 of the casing 2 a shoulder 4 is provided. This shoulder 4 is prepared by suitable means, e.g., by upsetting the plastic casing 2 at elevated temperature to cause a bulge creating the shoulder 4. The shoulder 4 includes a first transverse side surface 11 proximal to and facing the same direction as a front side transverse side surface 11' of the casing and an opposing side surface 12 distal to and turned away from the front surface 11' of the casing. (The shoulder sides 11 and 12 are only indicated in FIG. 1)

Figure 2:
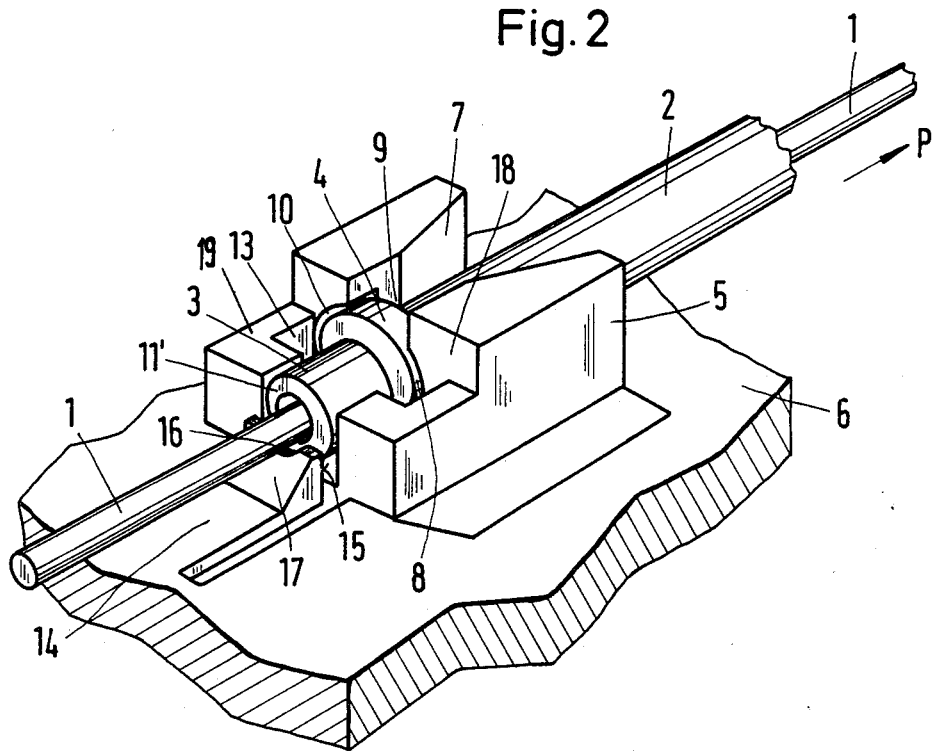
FIG. 2 shows the cable of FIG. 1 fixed in a preferred embodiment of the invention.

Referring to FIG. 2, a holding block 5 is prepared on a holder 6 to fix the end 3 of the casing 2. At one end (the front end), the holding block 5 is provided with a generally cylindrical recess 8 which is axially open at a front surface 18 of the block. This recess is limited by a bottom 9 and an edge surface 10 connecting the bottom 9 with the front surface 18. The holding block 5 has a continuous, radially open slot 7 which widens or flares as it extends "backwards" in an axial direction through the block so as to readily receive and guide a casing into the remainder of the slot 7. The slot 7 extends axially completely through and radially into said block and into said recess 8, cutting through the bottom 9 and the edge surface 10 of the recess. In the zone of the edge surface 10 and bottom 9, the slot 7 is approximately as wide as the diameter of the casing 2 though it could be wider than said diameter. However, the slot must be smaller than the external diameter of the shoulder 4 at least in the zone of the bottom 9 and edge surface 10 to assure that the edge surface 10 and bottom 9 interferringly engage the shoulder 4. The side surface 12 of the shoulder 4 (shown only in FIG. 1), which is turned away from the front side 11' of the end 3 of the casing 2, lies against the bottom 9. Interference engagement with the bottom 9 prevents further penetration of the shoulder 4 into the recess 8. The circumference of the shoulder 4, which is surrounded by the edge surface 10, interfers with said surface 10 in such a way that the shoulder 4 is unable to escape upward through the slot 7.

A flexible tongue 14, which is aligned with the slot 7, is provided on the holder 6 in front of the one front surface 18 facing the surface 18 and recess 8. The flexible tongue 14 has a stopping face 15 facing the one front surface 18 and the front side surface 11 of the casing end 3 when the casing 2 is fixed in the device. The flexible tongue 14 is provided with a recess 16 in order that it not hinder the free movement of the cable 1. A sloped stopping surface 17 is provided on the flexible tongue 14 opposite the stopping face 15 to allow the casing 2 and shoulder 4 to be drawn across the tongue 14 in the direction of arrow P, without hindrance.

A space 13, whose axial and transverse cross sectional dimensions are at least as great as the axial length and diameter, respectively, of the shoulder 4 and which is open upward, is provided in front of the recess 8 between the one side 18 and the tongue 14 by a pair of arms 19 of the block 5 extending from the one surface 18. The arms 19 restrain the casing from side to side movement thereby guiding the casing 2 as it is pulled in the direction P across the tongue 14 and through the slot 7 and fix the end 3 of the casing from side to side movement when the shoulder 4 is finally seated in the recess 8. The space allows the shoulder 4 to drop between the tongue 14 and front side 18 and align axially with the recess 8.

To fix the end 3 of the casing 2 with the device, the casing 2 is first placed into the slot 7 from the top. At this point in the process, the shoulder 4 can now be located in the zone of the flexible tongue 14. The casing 2 is then pulled in the direction indicated by the arrow P in FIG. 2. The shoulder 4 slides up the sloped stopping surface 17 and is stopped on surface 18 of the holding block 5 over the space 13 into which it is either pushed or falls. The flexible tongue 14 is bent downward by the end 3 of the casing 2. The casing 2 is then pulled farther in the direction indicated by the arrow P. The shoulder 4 thus enters the recess 8 and stops at when side 12 lies against bottom 9. The flexible tongue 14 snaps back into position blocking the front side surface 11' of the casing from movement in the opposite direction.

It is not absolutely necessary to pull the shoulder 4 up the sloped stopping surface 17. The shoulder 4 of the casing 2 may be pressed directly into the space 13, after which it reaches the recess 8 by pulling the casing 2 in the direction P.

After the shoulder 4 of the casing 2 is thus positioned in the recess 8 of the holding block 5, the casing 2 is unable to move axially relative to the holding block 5 either in the direction of the arrow P or in the opposite direction. One of these movements is prevented by interferring engagement of the bottom 9 with the shoulder 4. The other movement is prevented by interference between stopping surface 15 and the front side 11. The casing 2 is unable to leave the slot 7, radially because its shoulder 4 is surrounded by the recess 8 and interferring engages with the edge surface 10 at the slot 7.

In another embodiment of the present invention (not illustrated), the flexible tongue 14 can be located to snap into position in front of the front side surface 11 of the shoulder 4 (i.e. the side proximal to and facing the end 3 of the casing 2).

While depicted as being mounted to a planar surface of a holder 5 so that the casing is approximately parallel with the plane of that surface when attached, the subject block and tongue could also be mounted on a platform positioned at an edge of or through a planar support member for mounting of a casing transversely to the plane of the holder.

One skilled in the art will appreciate that the holding block and tongue can be formed on a holder surface or formed separately and attached thereto by conventional means. One skilled in the art will also appreciate that although the block 5 and tongue 14 are depicted as being monolithically formed, circumstances might suggest one or both be formed from the assembly of a plurality of separate elements for ease or reduced of manufacture. One also skilled in the art would also appreciate that the block 5 could be provided with a conical or partially conical recess instead of or connected with a substantially cylindrical recess as shown, having an edge surface extending sufficiently above the arms 19 so as to capture the shoulder 4 as it slides over the arms 19 to said surface 18.

We claim:

1. A device for locking an end of a tubular casing having an outer diameter and bearing a shoulder having a greater outer diameter and movably guiding a contained flexible pulling or pressing member characterized in comprising: a holding block having a recess (8) open axially on one side (18) of the holding block (5), a bottom (9) of the recess for receiving a side (12) of a shoulder (4) which is turned away from a front side (11') of an end (3) of the casing (2) and an edge surface (10) for surrounding the shoulder (4), a radially open slot (7) extending through the holding block (5) and through the bottom (9) and the edge surface (10) of the recess (8) and at least as broad as an outer diameter of the casing (2), for receiving the casing (2) and less broad than an outer diameter of the shoulder (4) at least in the zone of the edge surface (10) and a bottom (9) for retaining the shoulder (4) in the recess (8); and a flexible tongue means (14) positioned in front of the holding block (5) facing said one side (18) of the block and (5) aligned with the slot (7), for stopping a transverse surface of the casing (2).

2. The device in accordance with claim 1 in combination with said casing and characterized in that said casing (2) has only a single shoulder (4).

3. The device in accordance with claim 1, characterized in that a space (13) is provided between the recess (8) and the flexible tongue means (14) for receiving the shoulder (4).

4. The device in accordance with claim 3 characterized in that a side (18) of the holding block (5) adjoins the space (13).

5. The device in accordance with claim 1, characterized in that the flexible tongue means (14) is positioned opposite an open end of the slot (7) so that said tongue is pushed away by a casing (2) inserted into the slot (7).

6. The device in accordance with claim 1, characterized in that said flexible tongue means (14) comprises a sloped stopping surface (17).

7. The device of claim 1 in combination with said casing and characterized in that said casing shoulder is monolithically formed with the casing.

8. The device of claim 7 wherein said slot widens as it extends axially through said block away from said recess and said one side of the block.

9. A device for the locking an end of a tubular casing having a substantially uniform outer diameter and a shoulder of greater outer diameter near said end comprising:

a holding block including a recess extending thereinto from one side thereof for receiving a casing shoulder, said recess including an edge surface for surrounding a casing shoulder inserted into said recess and a bottom for interferring engagement with a casing shoulder inserted into said recess, and the block further including an open slot extending axially completely through said block from said one side (18) and radially into said block and into said recess through said edge surface and said bottom for receiving a casing in said block, said slot being sufficiently broad to accept said substantially uniform outer diameter of the casing and less broad than said greater outer diameter of the shoulder at least along parts of said edge surface and said bottom; and a stopping member positioned adjoining the one side of the holding block facing the open recess and aligned with the slot for interferring engagement with a transverse surface of the casing in the vicinity of said end of the casing.

10. The device of claim 9 further comprising a pair of arms extending axially from said one side of holding block towards said stopping member for forming a space adjoining said recess to receive the shoulder of the casing and for restraining side to side movement of said casing when positioned in said slot.

* * * * *